No. 668,706. Patented Feb. 26, 1901.
L. BAYER.
CYLINDER WITH LIQUID PACKING FOR EXPLOSION OR INTERNAL COMBUSTION ENGINES.
(Application filed Feb. 23, 1900.)
(No Model.)
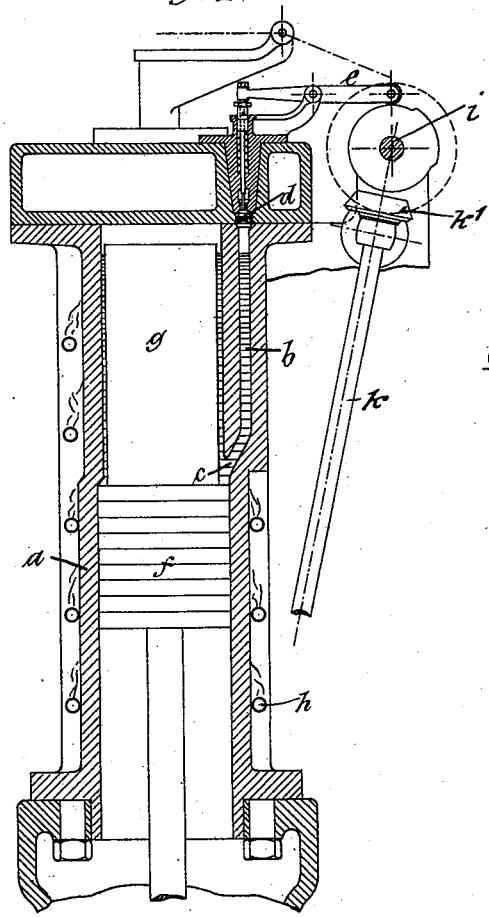
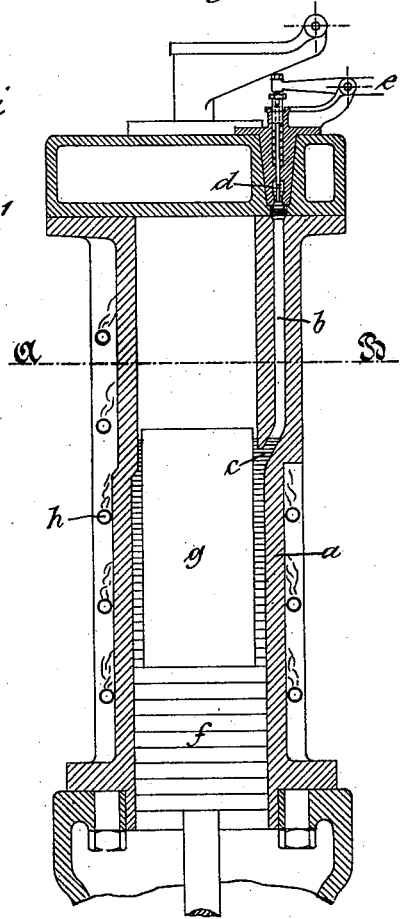
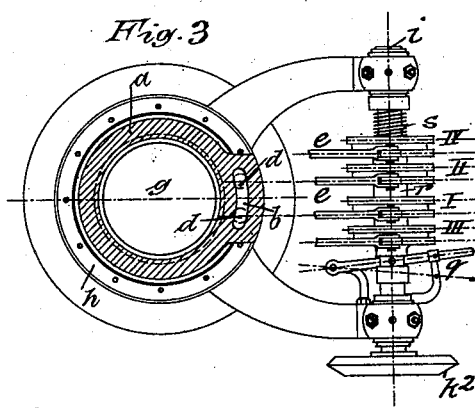
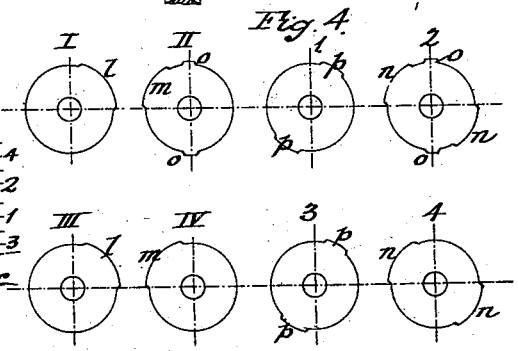
Witnesses
Inventor
Ludwig Bayer
by his Attorney

UNITED STATES PATENT OFFICE.

LUDWIG BAYER, OF MUNICH, GERMANY.

CYLINDER WITH LIQUID PACKING FOR EXPLOSION OR INTERNAL-COMBUSTION ENGINES.

SPECIFICATION forming part of Letters Patent No. 668,706, dated February 26, 1901.

Application filed February 23, 1900. Serial No. 6,261. (No model.)

*To all whom it may concern:*

Be it known that I, LUDWIG BAYER, engineer, a subject of the King of Bavaria, residing at Blutenburgstrasse 12ª/I, Munich, in the Kingdom of Bavaria, Germany, have invented certain new and useful Improvements in or Relating to Cylinders with Liquid Packings for Explosion or Internal-Combustion Engines, of which the following is a specification.

Attempts hitherto made in connection with combustion-motors to obviate the necessity of cooling the cylinders with water by the use of liquid metals and such like as packing for the piston instead of the ordinary packing-rings have for the most part not led to practical results.

The present invention relates to a cylinder of the vertical type constructed on novel principles, which is shown, in—

Figures 1 and 2 of the annexed drawings in vertical section and in Fig. 3 partly in horizontal section on the line A B of Fig. 2. Fig. 4 is a diagram showing certain cams hereinafter referred to.

A channel $b$ leads into the cylinder $a$ through the opening $c$. At the upper end of the said channel is an air-valve $d$, or, preferably, two air-valves are used, (see Fig. 3,) which are operated automatically from shaft $e$. $f$ is an ordinary piston, of which a second one, $g$, of somewhat smaller diameter is a continuation. The piston $g$ is rather longer than its stroke. As packing material under conditions hereinafter described a liquid is used, preferably non-volatile easily-melting metals, such as bismuth, cadmium, lead, and such like, or alloys of same. The liquid metal is poured through the channel $b$ into the heated cylinder, entering the annular space between the walls of the cylinder and the piston $g$. The quantity poured in must be such that the level of the liquid metal, which is the same in the cylinder and the channel $b$, does not quite reach up to the level of the top of the piston $g$ when the latter is at the highest point of its stroke. (See Fig. 1.) The diameter of the lower part of the cylinder is somewhat larger than that of the upper part, so that when the liquid metal has descended with the downstroke of the piston it still does not reach the upper surface of the piston $g$. The liquid is thus prevented from flowing over the surface of the piston at the moment when the latter reverses its stroke, and the shock caused by the upward impetus of the liquid when the piston has reached its highest point and which rendered systems hitherto used impracticable is removed.

The action of the apparatus is as follows: On the downward stroke of the piston (suction period) the valve $d$ opens, so that no vacuum is created in channel $b$. When the piston has reached its lowest point preparatory to its upstroke, (compression period,) valve $d$ is closed, and thus an equal pressure in cylinder and channel results. Until the piston has reached its highest point on the upstroke the level of the liquid remains at the same distance below the upper surface of the piston; but on the piston reversing its action the upward impetus previously given the liquid would in the ordinary course carry the latter on, thus creating a vacuum underneath said piston and further compressing the air above it, thereby causing a comparatively forcible shock. To obviate this, shortly before the piston has reached the end of its upstroke the valve $d$ opens and allows air to escape from the channel $b$ in such quantity as will create a difference in pressure between the cylinder and pipe approximately equal in force to the impetus acquired by the liquid. Thus, for instance, if the latter is about equivalent to 1.5 atmospheres pressure and the air-pressure in the cylinder is about thirty-five atmospheres the pressure in the channel $b$ is reduced, by means of a valve $d$, to about thirty-three atmospheres. The liquid in the cylinder is thus given a receding motion before the piston has reached its highest point, and the creation of a vacuum below said piston and consequent shock is prevented. The air must not be allowed to escape suddenly. It is therefore advisable that the piston of the valve $d$ should be small and, if necessary, that the air should be made to pass through small openings before escaping. On descent of the piston again (expansion period) explosion and expansion take place. The valve $d$ closes as the piston commences the downstroke, so that the air-pressure above the surfaces of the liquid in the cylinder and the channel is again equal; but the quantities of air being different the level of the liquid in the channel is higher, which, however, is of no importance. When the expansion has finished, the exhaust-valve and the valve $d$ are both opened and the levels of the liquid become equal again. On the up-stroke of the piston (exhaust period) the spent gas is not let off entirely until the end of the upstroke; otherwise the impetus of the liquid would in this case cause a shock, the more so as in the absence of compressed air above the piston the liquid would be thrown forcibly against the top or cover of the cylinder. Therefore before the piston reaches its highest point the exhaust-valve and the valve $d$ are closed and small portions of gas and air are retained in the cylinder and channel, respectively. Then, as before described and also before the end of the upstroke, a quantity of air corresponding in pressure to the force of the impetus of the liquid is allowed to escape from channel $b$ and the reversal of the stroke of the piston takes place without shock.

The valves are preferably operated by a common shaft and otherwise in the usual manner. If only one valve $d$ is provided for the channel $b$, it has to open and close four times in rapid succession for each complete stroke of the piston. To secure greater precision and easy regulation, it is better to provide two valves.

The valves are preferably operated by a common shaft $i$, the number of revolutions of which is equal to half the number of revolutions of the machine and which is driven by the main shaft by means of beveled gear-wheels $k'$ $k^2$ and the shaft $k$ in the known manner. For each valve of the connecting-pipe $b$ and the cylinder two cam-disks are required, one of which serves for the regular working, the other for the starting of the engine. These are represented in Fig. 4. The cam-disks serving for the regular working of the communicating pipe $b$ are designated I and II, those of the cylinder III and IV. The numerals 1, 2, 3, and 4 indicate the cam-disks for starting the engine, 1 and 2 being those for the valves for the pipe $b$ and 3 4 those for the cylinder. The suction of air corresponds to the extension $l$. The escape corresponds to the extensions $m$ and $n$. Through the extension $o$ the escape of pressure corresponding to the impetus of the liquid forced upward takes place and through the extension $p$ the admission of compressed air on the starting of the engine. As soon as the fly-wheel has sufficient impetus after the start the adjustment from the position of starting to the regular working position takes place. This can be effected in any suitable known manner—for instance, by means of an adjustable lever $q$. In this case the sleeve $r$ and all the cams are made in one piece, revolving with the axle $i$, but also arranged to slide upon the latter and forced forward by a spring $s$. When the lever $q$ is moved into the position $x$, the sleeve $r$ and the cams are displaced in such a manner that the set of cams for starting are moved out of action and those for regular working are moved underneath the stationary valve-levers $e$.

Although the temperature of the cylinders in motors of the kind in question is considerably higher than the melting-point of the metals or alloys used, external heating may be provided—for example, as indicated in the drawings at $h$—especially as it is in any case required when starting the motor. The burners $h$ are arranged to heat the cylinder in such a manner that when they are lighted metal introduced in a liquid state does not solidify, or, if solidified, said burners melt the said metal in the cylinder.

While in motors hitherto used it was necessary to draw off heat and cool the cylinders, in motors with liquid packing for the pistons the object is to retain the heat and prevent it from radiating.

The advantages of this system, besides that of obviating the necessity of cooling the cylinders, are the following: Cooling is also rendered unnecessary at the parts where friction takes place between the packing and the cylinder, because the heat generated at this point is absorbed in keeping the metal in a liquid condition. The piston itself need no longer be gas-tight, but only liquid-tight. In petroleum-motors the escape of obnoxious vapors is prevented. As the piston $g$ does not touch the sides of the cylinder, the latter can at the places which become most heated be made of some material which resists very high temperature better than metal, and this applies also to the piston $g$. Compared with these advantages the time required for heating when starting the motor is of small account, and in engines of machines which work intermittently the external heating arrangement need only be kept going to render the machines always ready to restart working.

I declare that what I claim is—

1. In explosion or internal-combustion motors the combination of a vertical cylinder, having a chamber communicating with it at a point above the piston at the highest point of its stroke, a piston therein having an upward extension of smaller diameter than the cylinder and greater in length than the piston-stroke, a liquid packing surrounding the extension of the piston and adapted to enter said chamber, a valve for closing the upper part of said chamber, and means for opening the said valve during the suction-stroke and at the end of the compression and exhaust strokes in order to give a receding tendency to the liquid packing about the piston extension sufficient to neutralize the upward momentum given to the liquid during the compression and exhaust strokes.

2. In explosion or internal-combustion motors the combination of a vertical cylinder, having a chamber communicating with it at a point above the piston at the highest point of its stroke, a piston therein having an upward extension of smaller diameter than the cylinder and greater in length than the piston-stroke, a liquid packing surrounding the extension of the piston and adapted to enter said chamber, means for allowing the escape of compressed air from the upper part of said chamber at the end of the compression and exhaust strokes in order to reduce the air-pressure therein to below that prevailing in the cylinder for the purpose set forth.

3. In explosion or internal-combustion motors the combination of a vertical cylinder, having a chamber communicating with it at a point above the piston at the highest point of its stroke, a piston therein having an upward extension of smaller diameter than the cylinder and greater in length than the piston-stroke, metal of low fusing-point forming a liquid packing surrounding the extension of the piston and adapted to enter said chamber, a valve for closing the upper part of said chamber, means for opening the said valve during the suction-stroke, and at the end of the compression and exhaust strokes in order to give a receding tendency to the liquid packing about the piston extension sufficient to neutralize the upward momentum given to the liquid during the compression and exhaust strokes, and means for heating the cylinder for liquefying the packing metal.

4. In explosion or internal-combustion motors the combination of a vertical cylinder, adapted to receive a piston in its lower part and reduced in diameter in its upper part, a chamber communicating with the cylinder at the base of the reduced part, a piston adapted to slide in the lower part having an upward extension of smaller diameter than the upper reduced part of the cylinder and greater in length than the piston-stroke, a liquid packing surrounding the extension of the piston and adapted to enter said chamber, means for reducing the air-pressure in the upper part of said chamber immediately before the end of the compression and exhaust strokes in order to give a receding tendency to the liquid packing about the piston extension in a direction into said chamber sufficient to neutralize the upward momentum given to the liquid in the cylinder during the upward movement of compression and exhaust strokes respectively of the piston.

In witness whereof I have signed this specification in the presence of two witnesses.

LUDWIG BAYER.

Witnesses:
MAX GERGEL,
MARY PALMBERGER.